United States Patent Office 2,956,055
Patented Oct. 11, 1960

2,956,055

HALOGENATED NITROGEN HETEROCYCLICS

Gerald D. Laubach, Jackson Heights, N.Y., assignor to Chas. Pfizer & Co., Inc., New York, N.Y., a corporation of Delaware No Drawing. Filed Oct. 20, 1958, Ser. No. 768,047

6 Claims. (Cl. 260—243)

This application is concerned with new and useful compounds and the process for their preparation as well as novel intermediates for which they are prepared. More particularly the present invention relates to new and useful compounds which are possessed of valuable therapeutic properties.

The new compounds of the present invention may be represented by the following formula:

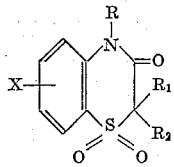

in which X is halogen (F, Cl, Br, I); $R_1$ and $R_2$ are alkyl containing 1 to 4 carbon atoms and R is hydrogen or alkyl containing 1 to 3 carbon atoms.

Of course the above described represent preferred substituents. As is obvious, R, $R_1$ and $R_2$ may be of higher carbon content and the benzenoid ring further substituted by the same substituents as above described for X. The present compounds may be called halogenated 2,2-dialkyl-1,4-benzothiazane-3-one-1,1-dioxides.

The halogenated 2,2-dialkyl-1,4-benzothiazane-3-one-1,1-dioxides described above are new compounds which are prepared by a two step synthesis. The first is the condensation of a halogenated o-aminobenzenethiol of the formula:

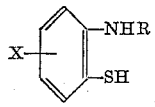

in which X and R are as described above, with a α-substituted ester of the formula:

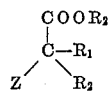

in which $R_1$ and $R_2$ are as described above, $R_3$ is lower alkyl, preferably ethyl, methyl or propyl and Z is halogen (Cl, Br, I) or a hydrocarbon sulfonyl group such as arylsulfonyl, for example, benzenesulfonyl and toluenesulfonyl (tosyl), and alkylsulfonyl, for example, methylsulfonyl (mesyl), ethylsulfonyl, etc. The resultant product is a halogenated 2,2-dialkyl-1,4-benzothiazane-3-one, represented by the formula:

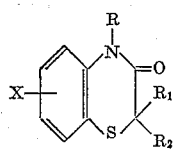

The reaction is best effected in a lower alkanol solvent, viz. methanol, ethanol, propanol, in the presence of a base such as an alkali metal hydroxide, viz. sodium, potassium or lithium hydroxide. Generally, the α-substituted ester is added to a solution of the aminobenzenethiol in alcoholic solution of hydroxide at a temperature of from about —10° to about 10° C. A precipitate forms almost immediately. After complete addition of ester, the mixture is refluxed for about 3 hours to ensure completeness of reaction, after which the product is recovered by conventional procedures. For example, the product is recovered by concentration of the filtered reaction mixture. The residue is then crystallized by trituration in petroleum ether.

The second step of this synthesis is accomplished by oxidation of the above described halogenated 2,2-dialkyl-1,4-benzothiazane-3-ones to the corresponding 1,1-dioxides. Suitable oxidizing agents are potassium permanganate and hydrogen peroxide. The reaction is preferably carried out by dissolving the substrate in a reaction-inert, water-miscible organic solvent, for example, dioxane, tetrahydrofuran and the like. The use of a solvent is not essential, however, since the substrate may be suspended in the oxidizing medium to obtain the desired product. The oxidizing agent is employed in an aqueous solution of a lower alkanoic acid such as acetic and propionic acid. The reaction is effected by simply contacting the above described solutions, preferably at about 0° C., and the product, which is insoluble, is obtained by conventional procedures.

Alternatively, the above benzothiazaneone intermediates may be prepared by the halogenation of the appropriate 2,2-dialkyl-1,4-benzothiazane-3-one with suitable halogenating agents such as the halogens or thionyl halides by convention procedures. The halogenation reaction principally results in nuclear substitution of the benzenoid ring of the benzothiazaneone employed.

The present new therapeutic agents are generally effective as muscle relaxants. They are useful as tranquilizers and in the treatment of the symptoms of muscular disorders such as bursitis, rheumatism, spasticity, strains and the like. When administered by the intraperitoneal route to mice, the L.D.$_{50}$ is 200 mg./kg. of body weight. The therapeutic effectiveness of the present agents is found to be of appreciable duration which makes them valuable in the treatment of muscle disorders.

The compounds of the present invention are conveniently administered in composition form. Such compositions include a pharmaceutical carrier selected on the basis of the chosen route of administration and standard pharmaceutical practice. For example, they may be administered orally in the form of tablets containing such excipients as starch, milk, sugar, certain types of clay, etc. They may be administerd in capsules, in admixtures with the same or equivalent excipients. They may also be administered orally in the form of oral suspensions which may contain flavoring and coloring agents. They may be injected parenterally, i.e. for example intramuscularly or subcutaneously. For oral administration of the therapeutic agents of this invention, tablets or capsules containing from about 25 to about 200 mg. are suitable for most applications.

The physician will determine the dosage which will be most suitable for an individual patient and it will vary with the form of administration, the age, weight, and response of the particular patient. Generally, however, the initial dosage in adults may range from 300 to 600 mg. per day divided into 3 or 4 equal doses. In many instances, it is not necessary to exceed 400 mg. daily. After the initial dosage, the maintenance dosage may often be achieved with as little as 100 to 200 mg. daily.

The following examples are given by way of illustration and are not to be construed as limitations of this

EXAMPLE I

2,2-dimethyl-1,4-benzothiazane-3-one

A solution of 18 g. of potassium hydroxide (0.32 mole) in absolute ethanol is added dropwise with stirring to a 3-necked flask containing 40 g. of o-aminobenzenethiol (0.32 mole) under nitrogen. Ethyl α-chloroisobutyrate (0.32 mole) is added dropwise to the mixture at 0° C. A precipitate forms almost immediately and the resultant mixture is refluxed for 3 hours. The insoluble salt is filtered off and the filtrate concentrated in vacuo to yield a thick syrup which on trituration with a mixture of equal parts of ether and petroleum either crystallizes as fine needles. The product melts at 150–153° C. Elemental analysis gives the following results:

Calculated for $C_{10}H_{11}NOS$: C, 62.14; H, 5.74. Found: C, 61.97; H, 5.87.

EXAMPLE II

A solution of 15 g. of 2,2-dimethyl-1,4-benzothiazane-3-one in 100 ml. of methylene chloride is stirred at 0° C. During the addition of 11.5 g. of sulfuryl chloride, a precipitate forms. The slurry is stirred for 3 hours at room temperature, filtered and recrystallized from ethyl acetate to yield 10.2 g. of chloro-2,2-dimethyl-1,4-benzothiazane-3-one, m. 190–192° C. Elemental analysis gives the following results:

Calculated for $C_{10}H_{10}NOSCl$: C, 52.8; H, 4.44. Found: C, 53.04; H, 4.39.

EXAMPLE III

Chloro-2,2-dimethyl-1,4-benzothiazane-3-one-1,1-dioxide

To a solution of 4 g. of chloro-2,2-dimethyl-1,4-benzothiazane-3-one prepared in Example II in 60 ml. of dioxane is added dropwise at 0° C. 8.3 g. of potassium permanganate in 93 ml. of water and 208 ml. of glacial acetic acid. The dark brown mixture is stirred at room temperature for 2 hours. The excess permanganate is decolorized with 30% hydrogen peroxide and the clear solution concentrated in vacuo to a white solid. The residue is then extracted with chloroform and washed with water. The chloroform solution is then concentrated and the residue crystallized with a methanol ether mixture. After recrystallization from ethyl acetate, the product melts at 223–226° C. Elemental analysis gives the following results:

Calculated for $C_{10}H_{10}NO_3SCl$: C, 46.25; H, 3.88. Found: C, 45.97; H, 4.02.

EXAMPLE IV

The following 2,2-dialkyl-1,4-benzothiazane-3-ones are prepared according to the procedure of Example I employing suitable aminobenzenethiols and α-substituted esters:

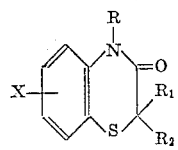

| Benzothiazaneone | | | | α-substituted ester |
|---|---|---|---|---|
| X | R | $R_1$ | $R_2$ | |
| 7-Cl | H | $CH_3$ | $C_2H_5$ | $C_2H_5C(CH_3)ClCOOCH_3$ |
| 6-Cl | H | $CH_3$ | $C_4H_9$ | $C_4H_9C(CH_3)BrCOOC_2H_5$ |
| 7-F | H | $CH_3$ | $CH_3$ | $CH_3C(CH_3)(tosyl)COOC_2H_5$ |
| 7-Br | H | $C_2H_5$ | $C_2H_5$ | $C_2H_5C(C_2H_5)ClCOOC_2H_5$ |
| 7-I | $CH_3$ | $C_3H_7$ | $CH_3$ | $C_3H_7C(CH_3)ClCOOC_2H_5$ |
| 8-Br | $C_3H_7$ | $C_4H_9$ | $CH_3$ | $C_4H_9C(CH_3)ClCOOC_2H_5$ |
| 8-F | $C_2H_5$ | $CH_3$ | $CH_3$ | $CH_3C(CH_3)(mesyl)COOC_2H_5$ |
| 7-Cl | H | $CH_3$ | $CH_3$ | $CH_3C(CH_3)ClCOOCH_3$ |
| 6-Cl | H | $CH_3$ | $CH_3$ | $CH_3C(CH_3)ClCOOCH_3$ |

EXAMPLE V

The benzothiazaneone of Example IV are respectively converted to the following dioxides by the method of Example III.

7 - chloro - 2-methyl-2-ethyl-1,4-benzothiazane-3-one-1,1-dioxide

6 - chloro - 2-methyl-2-butyl-1,4-benzothiazane-3-one-1,1-dioxide 7-fluoro-2,2-dimethyl-1,4-benzothiazane-3-one-1,1-dioxide N - methyl - 7 - bromo - 2,2-diethyl-1,4-benzothiazane-3-one-1,1-dioxide N - methyl - 7 - iodo - 2 - methyl - 2-propyl-1,4-benzothiazane-3-one-1,1-dioxide N - propyl - 8-bromo-2-methyl-2-butyl-1,4-benzothiazane-3-one-1,1-dioxide N - ethyl - 8 - fluoro - 2,2-dimethyl-1,4-benzothiazane-3-one-1,1-dioxide 7 - chloro - 2,2 - dimethyl - 1,4-benzothiazane-3-one-1,1-dioxide 6 - chloro - 2,2 - dimethyl - 1,4-benzothiazane-3-one-1,1-dioxide The starting compounds for the above reactions, viz. aminobenzenethiols and α-substituted acid esters are known compounds which are readily available or easily preparable by one skilled in the art.

EXAMPLE VI

A tablet base is prepared by blending the following ingredients in the proportion by weight indicated:

| | |
|---|---|
| Sucrose, U.S.P. | 82.0 |
| Tapioca starch | 13.6 |
| Magnesium stearate | 4.4 |

Into this base is blended a sufficient amount of 7-chloro-2,2-dimethyl-1,4-benzothiazane-3-one-1,1-dioxide to provide tablets each containing 25 mg. of active ingredient.

EXAMPLE VII

Into the tablet base of Example VI is blended a sufficient amount of 7-fluoro-2,2-dimethyl-1,4-benzothiazane-3-one-1,1-dioxide to provide tablets containing 50 mg., 100 mg., and 200 mg. of active ingredient.

EXAMPLE VIII

Sesame oil is sterilized by heating at 120° C. for 2 hours. To this oil a sufficient quantity of pulverized N - methyl - 7-bromo-2,2-diethyl-1,4-benzothiazane-3-one-1,1-dioxide to make a 0.025% suspension by weight. The solid is thoroughly dispersed in the oil by use of a colloid mill. It is then filtered through a 100 to 250 mesh screen and poured into steriled vials.

EXAMPLE IX

Aqueous suspensions are prepared each containing 50 mg. per teaspoonful (5 ml.) of each of the above described halogenated 2,2-dialkyl-1,4-benzothiazane-3-one-1,1-dioxides in a vehicle composed of U.S.P. simple syrup containing the following materials per 100 ml. of vehicle:

| | |
|---|---|
| F. D. and C. yellow No. 5 _____mg__ | 5 |
| Carboxymethylcellulose, low-viscosity type ___mg__ | 1 |
| Synthetic lemon flavor (Freitsche) _____ml.__ | 0.1 |

These suspensions are particularly well adapted for oral administration of the active agent.

EXAMPLE X

To a commercially available raspberry-flavored sugar syrup is added the equivalent of 40 mg. of 6-chloro-2-methyl - 2 - butyl-1,4-benzothiazane-3-one-1,1-dioxide per milliliter and the mixture is homogenized in a mechanical device for this purpose. This mixture is especially suitable for oral administration, containing 200 mg. of the active ingredient per teaspoonful (5 ml.).

What is claimed is:

1. A compound represented by the formula:

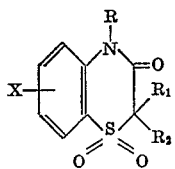

in which R is selected from the group consisting of hydrogen and alkyl containing 1 to 3 carbon atoms; $R_1$ and $R_2$ are alkyl containing 1 to 4 carbon atoms; and X is halogen.

2. 6 - chloro-2,2-dimethyl-1,4-benzothiazane-3-one-1,1-dioxide.

3. 7 - chloro-2,2-dimethyl-1,4-benzothiazane-3-one-1,1-dioxide.

4. A compound represented by the formula:

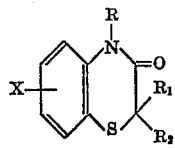

in which R is selected from the group consisting of hydrogen and alkyl containing 1 to 3 carbon atoms; $R_1$ and $R_2$ are alkyl containing 1 to 4 carbon atoms; and X is halogen.

5. 6-chloro-2,2-dimethyl-1,4-benzothiazane-3-one.

6. 7-chloro-2,2-dimethyl-1,4-benzothiazane-3-one.

References Cited in the file of this patent

FOREIGN PATENTS

| 447,179 | France | Oct. 21, 1912 |
| 256,342 | Germany | Feb. 10, 1913 |

OTHER REFERENCES

Mills et al.: J. Chem. Soc., 1927, pp. 2738–2753.
Mackie et al.: J. Chem. Soc., 1952, pp. 787–790.
Knorr: Ber. der. Deutsch. Chem. Gesell., vol. 30. pp. 2393–2396 (1897).
Dills et al.: Chem. Abst., vol. 44, p. 9615 (1950), citing J. Econ. Entomology, vol. 43, pp. 384–385 (1950).